May 12, 1953 R. G. PIETY 2,638,578
SEISMOMETER
Filed Feb. 11, 1952 2 Sheets-Sheet 1

INVENTOR.
R.G. PIETY
BY
Hudson & Young
ATTORNEYS

May 12, 1953   R. G. PIETY   2,638,578
SEISMOMETER

Filed Feb. 11, 1952   2 Sheets-Sheet 2

INVENTOR.
R.G. PIETY
BY
Hudson & Young
ATTORNEYS

Patented May 12, 1953

2,638,578

UNITED STATES PATENT OFFICE 2,638,578

SEISMOMETER

Raymond G. Piety, Bartlesville, Okla., assignor to Phillips Petroleum Company, a corporation of Delaware Application February 11, 1952, Serial No. 270,923

20 Claims. (Cl. 340—17)

This invention relates to a seismometer. In another aspect, it relates to a system for transforming seismic waves into electrical voltages representative thereof.

Seismometers are utilized to transform small movements, such as earth tremors, into electrical voltages representative thereof. Such devices ordinarily comprise a casing, and a suspended element supported from the casing by a spring suspension. Relative movement between the casing and suspended element changes a parameter of an electrical circuit, thereby to produce a voltage or current wave representative of the disturbance producing the relative movement.

In many cases, the variation of the electrical circuit parameter modulates an oscillatory carrier voltage produced by a suitable oscillator. This permits the modulated wave to be readily amplified and thereafter demodulated to produce an electrical output representative of the seismic waves. This is quite advantageous since many seismic signals are of such low frequency that direct amplification thereof is quite difficult or expensive.

In seismometers generally, and particularly in seismometers of the modulator type, it is important that the initial spacing between the electrical elements carried by the casing and those carried by the suspended element be carefully maintained prior to the incidence of seismic waves upon the apparatus. If such variations in spacing cannot be prevented, they should be compensated for electrically. Otherwise, the variation in spacing caused, for example, by improper planting of the seismometer, will cause modulation of the carrier signal in the same fashion as the seismic waves and, therefore, produce an incorrect output. Such variations are ordinarily quite slow compared to the variations produced by seismic waves. That is, the unwanted variations have a long period as compared with the period of the seismic waves.

It is an object of the invention to provide an improved circuit for transforming seismic waves into electrical output variations representative thereof so as to eliminate the effect of such unwanted variations.

It is a further object to provide a seismometer of novel and improved construction.

Various other objects, advantages and features of the invention will become apparent from the following detailed description taken in conjunction with the accompanying drawings, in which.

Figure 1:
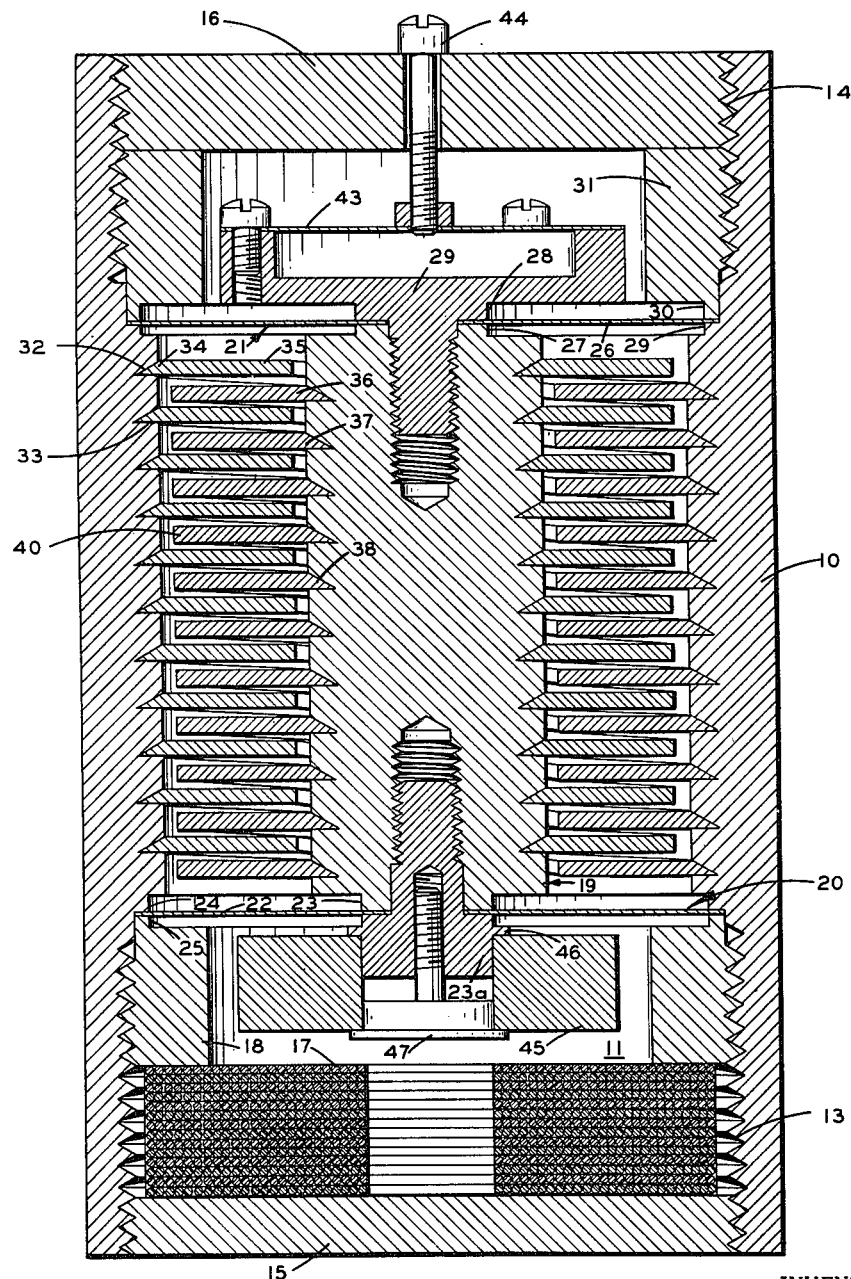
Figure 1 is a vertical sectional view of a seismometer constructed in accordance with this invention.

Referring now to Figure 1, the seismometer comprises a generally cylindrical casing 10 shaped to form an interior passage 11 having screw threaded portions 13 and 14 at the respective ends thereof. The ends of the passage are closed off by threaded end caps 15 and 16, respectively.

An annular coil 17 is mounted within passage 11 in engagement with end cap 15, and a threaded annular lock ring 18 is provided to hold the coil 17 in position. Mounted in the passage 11 of the casing is an elongated suspended element 19 which is supported for relative movement with respect to casing 10 by a pair of spring suspension units 20 and 21. Unit 20 comprises a flat leaf spring 22 secured at its inner end between a reduced end portion 23 of the suspended element and the head of a bolt 23a. The peripheral portion of the spring is secured between a flanged portion 24 of the casing and a flange 25 formed on lock ring 18. In similar fashion, spring suspension unit 21 includes a flat leaf spring 26, the inner end of which is secured between a reduced end portion 27 of the suspended element and a flange 28 formed upon a bolt member 29, the outer portion of the spring being secured between a flange 29 formed on the casing and a flange 30 formed on an annular threaded lock ring 31 abutting the end cap 14.

Two sets of helical or spiral grooves are cut in the interior wall of the casing 10 and these grooves receive, respectively, a pair of helical metal condenser elements 32 and 33, each element having a tapered outer edge 34 which fits into the corresponding grooves in the casing together with a thin flat inner portion 35 which protrudes radially inward from the corresponding groove. The elements 32 and 33 may be conveniently formed upon a lathe and they are fitted into their respective grooves in much the same manner as a nut is screwed onto a bolt. In similar fashion, the suspended element 19 is provided with two sets of helical or spiral grooves into which are fitted a pair of helical metal condenser elements 36 and 37. These elements are similar to the elements 32 and 33 except that the tapered portion 38 of each of the elements 36 and 37 is formed along the inner edge of the element rather than along the outer edge, the flat plate portions 40 protruding outwardly from the suspended element.

It will be noted, therefore, that the elements 32, 33 alternate with the elements 36, 37 when the complete seismometer unit is assembled and that relative movement between casing 10 and suspended element 19 causes the capacitance between the sets of condenser elements to vary in accordance with the magnitude of the disturbance incident upon the seismometer. An important advantage of this construction is that the space in which the condenser elements are mounted is very efficiently utilized and, of course, the condenser elements may be individually removed for adjustment or replacement merely by unscrewing them from the casing or suspended elements.

In order to permit an initial adjustment of the position of the suspended element 19, a flat spring 43 is secured to the bolt member 29, and a bolt 44 is threaded in end cap 16, the inner end of the bolt bearing against spring 43 to urge it downwardly when the bolt is tightened, or permit the unit to be raised when the bolt is loosened. In accordance with the invention, an annular armature member 45 of magnetic material is secured at the bottom of the suspended element. To this end, a flange 46 is formed on bolt 23a to receive the inner end of the armature and a bolt 47 is screw threaded into bolt 23a, the head of bolt 47 engaging the armature and forcing it into engagement with the flange 46. When current is supplied to coil 17, the armature is attracted or repelled, depending upon the polarity of the current. In this manner, the initial position of the suspended element 19 is shifted upwardly or downwardly with respect to the casing 10. The voltage supplied to coil 17 is automatically adjusted so that variations in plate spacing due, for example, to improper planting of the seismometer are compensated for.

Figure 2:
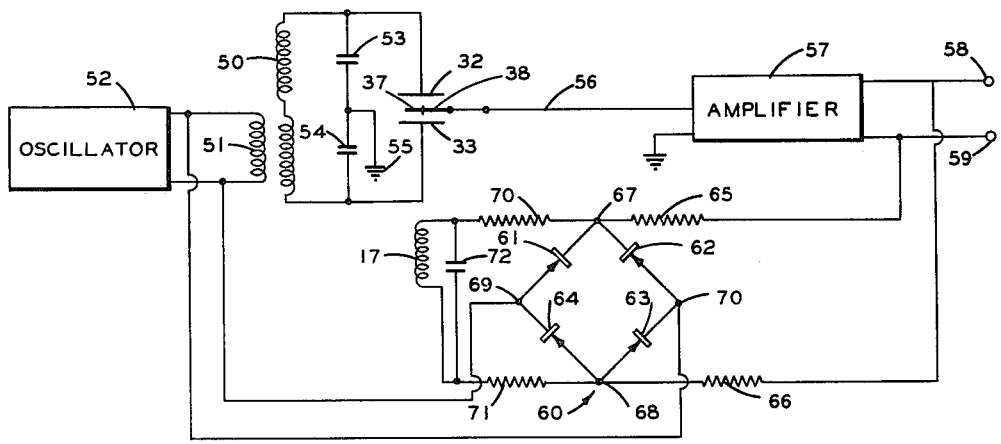
Figure 2 is a schematic circuit diagram of a compensating circuit for use with the seismometer of Figure 1; and, Figure 3 is a schematic circuit diagram of a push-pull compensating circuit.

In Figure 2, I have shown a novel circuit for supplying the compensating voltage to the coil 17. In this circuit, the condenser elements 32, 33 mounted on the casing are connected in circuit with a coil 50 which is inductively coupled by a winding 51 to an oscillator 52. Winding 50 is shunted by a pair of series-connected condensers 53, 54 of equal capacitance, the lead connecting these condensers being grounded at 55. The condenser elements 37, 38 on the suspended element are connected together, and to a lead 56 which extends to one input terminal of an amplifier 57, the other input terminal of which is grounded.

Oscillator 52 provides an alternating carrier voltage which is modulated by the movement of elements 32, 33 relative to elements 37, 38. The modulating voltage is produced by seismic waves of relatively short periods which are incident upon the seismometer and by disturbances of long or infinite period produced by factors tending to cause misalignment of the condenser plates. Such misalignment may be caused by improper planting of the seismometer, temperature changes, or even by changes in humidity. The circuit of this invention eliminates these long term disturbances from the output of the amplifier 57.

A portion of the amplifier output is fed to output terminals 58, 59 while another portion of the amplifier output is fed to a demodulator circuit 60 consisting of four rectifiers 61 to 64, inclusive, connected in a bridge circuit, the amplifier output being fed through two resistances 65, 66 to two opposite corners 67, 68 of the bridge. A portion of the output of oscillator 52 is impressed across the other corners 69, 70. Due to the arrangement of the rectifiers, the alternating carrier waves produced by oscillator 52 oppose and cancel out the alternating current component of the modulated signal fed to the bridge from amplifier 57. The demodulated voltage appears across bridge corners 67, 68 and is fed to coil 17 through a filter of long time constant consisting of resistances 70, 71 and a condenser 72. Due to the long time constant of the filter as compared with the period of seismic waves, the coil 17 receives a voltage proportional to the extent of the long term disturbances previously mentioned. The polarity of the coil is such that a degenerative feed back effect is produced by the system. Thus, if a disturbance of long period causes element 33 to be positioned too closely to elements 37, 38, the current fed to coil 17 is of such polarity as to move elements 37, 38 away from element 33 to its correct position. In this manner, long period disturbances are completely compensated for and the output of the amplifier appearing at terminals 58, 59 contains only the alternating carrier voltage modulated by voltages representative of the seismic waves. It will be apparent from the foregoing description that the principles of this invention are applicable to seismometers of other types than capacitance seismometers. In fact, the principals of the invention can be advantageously applied to any modulator type of seismometer.

Figure 3:
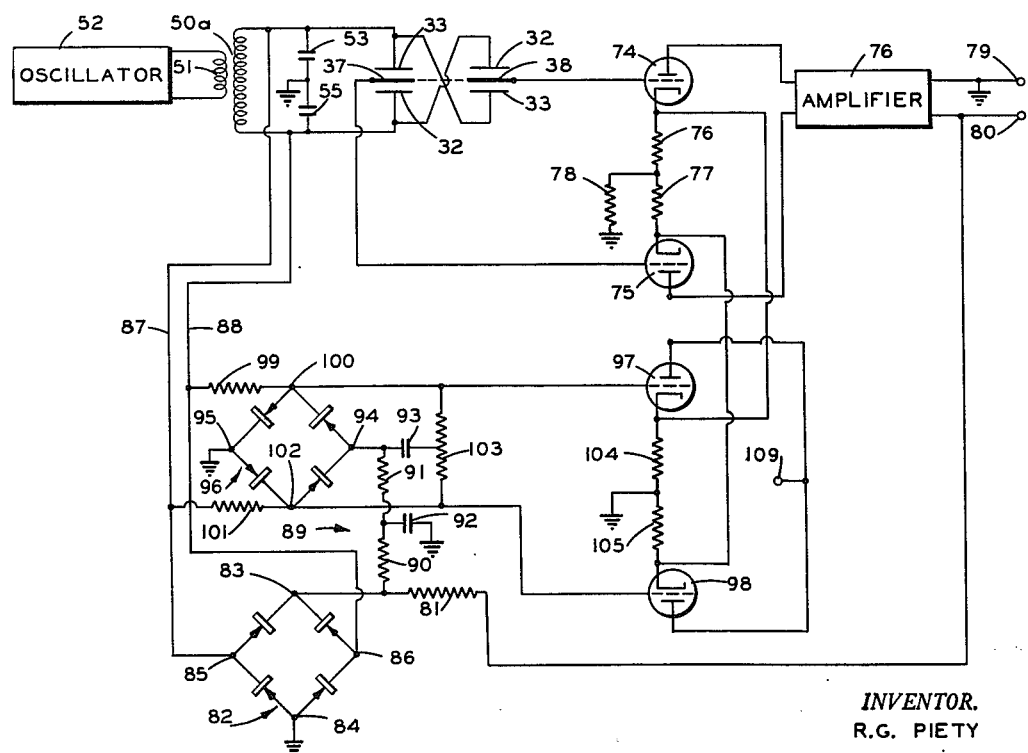

In Figure 3, a push-pull amplifier circuit is used and the compensation is effected by applying a correction voltage to the amplifier input circuit, rather than a physical correction force to the suspended element of the seismometer. This circuit, although applicable generally to modulated type seismometers, is described in connection with a seismomter of the type shown by Figure 1 in which elements 37, 38 are not connected together and the elements are split into upper and lower half sections which are associated with the condenser elements carried by the casing in the manner indicated by Figure 3. The plates are connected in circuit with oscillator 52, windings 50a, 51 and condensers 53, 55 in the manner explained in connection with Figure 2. The condenser elements 32 and 33 are connected, respectively, to the control grids of a pair of electron tubes 74, 75 connected in push-pull circuit arrangement and constituting the input stage of an amplifier 76. The cathodes of these tubes are connected together by a pair of series resistances 76, 77, the junction between which extends to ground through a bias resistor 78. The anodes of electron tubes 74, 75 are connected to a coupling transformer incorporated in the amplifier 76.

The output of the seismometer constitutes two modulated voltage waves of opposite phase which are applied in the usual manner to the amplifier circuits, each wave consisting of the carrier voltage modulated by voltages representative of the seismic waves and of the long term disturbances which are to be eliminated.

One portion of the output of amplifier 76 is fed to output terminals 79, 80, and another portion of the output voltage is fed through a resistance 81 to a demodualtor unit 82 consisting of four rectifiers connected in a bridge arrangement. As shown, the amplifier output is impressed upon two opposite corners 83, 84 of the bridge while the other pair of opposite corners 85, 86 receive a portion of the oscillator output by way of leads 87, 88. The demodulator circuit functions in the manner described in connection with the circuit 60 of Figure 2, the demodulated voltage being withdrawn from bridge corners 83, 84 and passed to the input of a filter 89 having a long time constant, as compared with the duration of seismic waves. This filter consists of series resistances 90, 91 and condensers 92, 93.

The output of filter 89 is impressed across two opposite corners 94, 95 of a second rectifier bridge 96 of the ring type. This bridge controls the application of carrier voltage from oscillator 52 to the control grids of a pair of electron tubes 97, 98 each having an anode, a cathode and a control grid. To this end, conductor 88 extends through a fixed resistance 99 to a corner 100 of bridge 96 and to the control grid of tube 97 while conductor 87 extends through a fixed resistance 101 to a corner 102 of the bridge and the control grid of tube 98. The grid circuit of the tubes is completed by a grid resistance 103 having a grounded center tap, and the anodes are connected to a positive power supply terminal 109. The cathodes of tubes 97, 98 are interconnected by a pair of series resistances 104, 105, the junction between which is grounded, and the cathodes of these tubes are further connected directly to the respective cathodes of tubes 74, 75. The anodes of tubes 97, 98 are connected to a positive power supply terminal 109.

In operation, where no long term disturbance is present to cause the seismometer plates to be incorrectly spaced, the output of demodulator 82 is zero and, therefore, bridge 96 is balanced. Under these conditions, the oscillator voltage fed to tubes 97, 98 is amplified and fed to the cathodes of tubes 74, 75 in out of phase relationship with respect to the carrier component of the signal voltages passing through these tubes. Therefore, there is no compensating action, but the carrier voltage of the seismometer output signal is suppressed by the output of tubes 97, 98. When a long term unbalanced condition exists, a positive or negative voltage, depending upon the sense of the unbalance, appears at the output of filter 89 and unbalances the bridge 96, thereby causing one of the tubes 97, 98 to produce a higher output than the output of the other tube. This produces an unbalanced effect which is proportional to the strength of the long term disturbances and, when this unbalanced signal is applied to the cathodes of tubes 74, 75, the long term disturbance is cancelled out of the modulated signal produced by the seismometer unit. The device, of course, is not affected by the seismic waves since their period is so short that they do not affect the filter 89 and appear in the output thereof.

It will be apparent that I have achieved the objects of my invention providing a seismometer of novel design and in providing circuits of wide utility in compensating for long term disturbances in seismometers of the modulator type, the circuit of Figure 2 providing a mechanical compensating effect and the circuit of Figure 3 providing an electrical compensating effect.

While the invention has been described in connection with present, preferred embodiments thereof, it is to be understood that this description is illustrative only and is not intended to limit the invention.

I claim:

1. A capacitive seismometer comprising, in combination, a casing having an interior passage, spaced end caps closing off the ends of said passage, a coil mounted within said passage and engaging one of said end caps, means for maintaining said coil in fixed position against said one end cap, a suspended element, a pair of spring suspension units movably mounting said suspended element within said passage, an armature secured to said suspended element and closely spaced to said coil, said casing having an interior passage, a helical metal condenser element disposed within said passage, said suspended element having an exterior helical metal condenser element contiguous to and interlaced with the element disposed within said passage, whereby relative movement between said suspended element and said casing produces a change in capacitance between said metal elements and energization of said coil moves said armature and suspended element toward and away from said coil.

2. A capacitive seismometer comprising, in combination, a casing having an interior passage, a coil mounted within said passage in fixed position, a suspended element, a pair of spring suspension units movably mounting said suspended element within said passage, an armature secured to said suspended element and closely spaced to said coil, said casing having a set of helical grooves formed therein, a complementary set of helical grooves formed in said suspended element, and a thin spiral metal condenser element disposed in each of said grooves so that each turn of one condenser element is positioned between two turns of the other condenser element.

3. A capacitive seismometer comprising, in combination, a casing having an interior passage, a coil mounted within said passage in fixed position, a suspended element, a pair of spring suspension units movably mounting said suspended element within said passage, an armature secured to said suspended element and closely spaced to said coil, said casing having two sets of interlaced spiral grooves formed therein, two sets of complementary spiral grooves formed in said suspended element, all of said grooves having the same pitch, and a thin spiral metal condenser element carried by each of said grooves whereby the turns of the four condenser elements are mounted in alternating relation proceeding from one end to the other end of said casing.

4. A capacitive seismometer comprising, in combination, a generally cylindrical casing having an internal passage provided with screw threaded portions at each end thereof, a threaded end cap fitted within each threaded end portion, an annular coil mounted within said passage in engagement with one end cap, a threaded annular retainer ring bearing against said coil to hold it in engagement with said one end cap, an elongated suspended element, a pair of spaced leaf springs mounting said element for axial movement within said passage, an annular armature member, means for securing said armature member to said suspended element in closely spaced position with respect to said coil, said casing having an interior passage, a helical metal condenser element disposed within said passage, said suspended element having an exterior helical metal condenser element contiguous to and interlaced with the element disposed in said passage, whereby relative movement between said suspended element and said casing produces a change in capacitance between said metal elements and energization of said coil moves said suspended element toward or away from said coil.

5. A capacitive seismometer comprising, in combination, a generally cylindrical casing member having an internal passage provided with screw threaded portions at each end thereof, a threaded end cap fitted within each threaded end portion, an elongated suspended member, a pair of spaced leaf springs mounting said suspended member for axial movement within said passage, an armature, means for securing said armature to one of said members, a coil secured to the other of said members in closely spaced position with respect to said armature, said casing member having two sets of interlaced spiral grooves formed therein, two sets of complementary spiral grooves formed in said suspended member, all of said grooves having the same pitch, and a thin spiral metal condenser element disposed in each of said grooves so that each turn of the one condenser element is positioned between two turns of the other condenser element.

6. A capacitive seismometer comprising, in combination, a generally cylindrical casing having an internal passage provided with screw threaded portions at each end thereof, a threaded end cap fitted within each threaded end portion, an annular coil mounted within said passage in engagement with one end cap, a threaded annular retainer ring bearing against said coil to hold it in engagement with said one end cap, an elongated suspended element, a pair of spaced leaf springs mounting said element for axial movement within said passage, an annular armature member, means for securing said armature member to said suspended element in closely spaced position with respect to said coil, said casing having two sets of interlaced spiral grooves formed therein, two sets of complementary spiral grooves formed in said suspended member, all of said grooves having the same pitch, and a thin spiral metal condenser element carried by each of said grooves whereby the turns of the four condenser elements are mounted in alternating relation proceeding from one end to the other end of said casing.

7. A seismometer constructed in accordance with claim 5 in which a flat spring is secured to said suspended element adjacent said other end cap, and an adjusting bolt is threaded within said other end cap, said bolt bearing against said last mentioned spring.

8. A system for transforming seismic waves into electrical voltages representative thereof which comprises, in combination, an oscillator, a seismometer of the type wherein movement of a casing relative to a suspended element varies an electrical parameter to modulate an alternating voltage wave produced by said oscillator, means for sensing modulation variations having a long period relative to the period of seismic waves, and means controlled by said sensing means to vary the modulated output of said seismometer so as to eliminate such variations of long period.

9. A system for transforming seismic waves into electrical voltages representative thereof which comprises, in combination, an oscillator, a seismometer of the type wherein movement of a casing relative to a suspended element varies an electrical parameter to modulate an alternating voltage wave produced by said oscillator, means for sensing modulation variations having a long period relative to the period of seismic waves, and means controlled by said sensing means to vary said parameter so as to eliminate such variations of long period.

10. A system for transforming seismic waves into electrical voltages representative thereof which comprises, in combination, an oscillator, a seismometer of the type wherein movement of a casing relative to a suspended element varies an electrical parameter to modulate an alternating voltage wave produced by said oscillator, means for amplifying said modulated voltage wave, means for demodulating said voltage wave, a filter fed by said demodulating means having a time constant substantially longer than the period of said seismic waves, whereby the filter output is a direct voltage varying in accordance with long period modulating signals, and means responsive to the output of said filter to vary the modulated output of said seismometer so as to eliminate such modulating signals of long period.

11. A system for transforming seismic waves into electrical voltages representative thereof which comprises, in combination, an oscillator, a seismometer of the type wherein movement of a casing relative to a suspended element varies an electrical parameter to modulate an alternating voltage wave produced by said oscillator, means for amplifying said modulated voltage wave, means for demodulating said voltage wave, a filter fed by said demodulating means having a time constant substantially longer than the period of said seismic waves, whereby the filter output is a direct voltage varying in accordance with long period modulating signals, and means to vary said electrical parameter in a proportionate manner to the output voltage of said filter.

12. A system constructed in accordance with claim 11 wherein said parameter is the capacitance between two condenser elements, one of which is mounted on said casing and the other of which is mounted on said suspended element.

13. A system for transforming seismic waves into electrical voltages representative thereof which comprises, in combination, an oscillator, a seismometer having a casing, a suspended element, and a spring suspension mounting said suspended element for relative movement with respect to said casing, such relative movement varying an electrical parameter to modulate an alternating voltage wave produced by said oscillator, an amplifier having an input circuit sensitive to variations in said modulated voltage wave, means for demodulating the output of said amplifier, and degenerative feed back means to combine the output of said demodulator with said modulated alternating voltage wave.

14. A system for transforming seismic waves into electrical voltages representative thereof which comprises, in combination, an oscillator, a seismometer having a casing member, a suspended member, a spring suspension mounting said suspended member for relative movement with respect to said casing member, such relative movement varying an electrical parameter to modulate an alternating voltage wave produced by said oscillator, an armature mounted on one of said members, and a coil mounted on the other of said members and adapted to attract or repel said armature, an amplifier having an input circuit responsive to said alternating voltage wave, a demodulating circuit fed by the output of said amplifier, and means for applying demodulated signals from last-mentioned circuit to said coil with such polarity that the coil tends to cause movement of said suspended element in a direction opposite to that producing the demodulated signal fed to said coil.

15. A system constructed in accordance with claim 14 in which said demodulating circuit is a rectifier bridge, a signal from said oscillator being impressed upon two opposite corners of said bridge and the amplifier output being impressed across the other two corners of said bridge.

16. A system for transforming seismic waves into electrical voltages representative thereof which comprises, in combination, an oscillator, a seismometer having a casing, a suspended element, a spring suspension mounting said suspended element for relative movement with respect to said casing, such relative movement varying an electrical parameter to modulate an alternating voltage wave produced by said oscillator, an amplifier having input circuit responsive to said alternating voltage wave, a demodulating circuit fed by the output of said amplifier, a filter fed by said demodulator, the time constant of said filter being substantially longer than the period of a seismic wave, and degenerative feed back means for applying the output of said filter to the input circuit of said amplifier.

17. A system for transforming seismic waves into electrical voltages representative thereof which comprises, in combination, an oscillator, a seismometer having a casing, a suspended element, a spring suspension mounting said suspended element for relative movement with respect to said casing, such relative movement varying an electrical parameter to modulate an alternating voltage wave produced by said oscillator, an armature secured to said suspended element, a coil mounted on said casing adjacent said armature, said coil being adapted to attract or repel said armature, an amplifier having an input circuit for receiving said modulated alternating voltage wave, a demodulating circuit fed by the output of said amplifier, a filter fed by the output of said demodulating circuit, said filter having a time constant substantially longer than the period of a seismic wave, and means for feeding the output of said filter to said coil.

18. A system constructed in accordance with claim 17 in which said demodulating circuit is a rectifier bridge of the ring type, a signal from said oscillator being impressed upon two opposite corners of said bridge and the amplifier output being impressed across the other two corners of said bridge.

19. A system for transforming seismic waves into electrical voltages representative thereof which comprises, in combination, an oscillator, a seismometer having a casing, a suspended element, a spring suspension mounting said elements for relative movement with respect to said casing, cooperating condenser plates carried by said casing and said element, relative movement between the casing and element causing corresponding variations in the capacitance between said plates, an armature carried by said suspended element, a coil carried by said casing to attract and repel said armature, means for supplying a voltage from said oscillator to the condenser plates carried by said casing, an amplifier, means for coupling the condenser plate on said suspended element to the input circuit of said amplifier so as to provide therein a modulated alternating voltage wave, a rectifier bridge, means for impressing the output of amplifier upon two opposite corners of said bridge, a filter having a long time constant as compared with the period of seismic waves having its input circuit connected to said two corners of the bridge, means for impressing a portion of the oscillator output upon the other two opposite corners of said bridge, and means for feeding the output of said filter to said coil.

20. A system for transforming seismic waves into electrical voltages representative thereof which comprises, in combination, an oscillator, a seismometer having a casing and a suspended element, two sets of condenser plates carried by said casing, and two sets of cooperating interlocked condenser plates carried by said suspended element, means for impressing the output of said oscillator upon said condenser plates carried by said casing, an amplifier having a push-pull input stage including two amplifier tubes each having an anode, a cathode and a control grid, leads connecting the respective condenser plates of said element to said control grids, a rectifier bridge, means for impressing the output of said amplifier across two opposite corners of said bridge, means for impressing a portion of the oscillator output across the other two corners of said bridge, a filter having a long time constant as compared with the period of a seismic wave, means connecting the input circuit of said filter across the first two corners of said bridge, a second rectifier bridge, means for impressing the output of said filter across two opposite corners of said second bridge, means for impressing a portion of the oscillator output across the other corners of said second bridge, a pair of electron tubes each having an anode, a cathode and a control grid, leads connecting the last-mentioned corners of said second bridge to the respective control grids of said vacuum tubes, and means connecting the cathodes of said vacuum tubes to the respective cathodes of siad amplifier tubes.

RAYMOND G. PIETY.

References Cited in the file of this patent
UNITED STATES PATENTS

| Number | Name | Date |
|---|---|---|
| 2,408,478 | Petty | Oct. 1, 1946 |
| 2,490,595 | Merten | Dec. 6, 1949 |